US011015304B2

United States Patent
Berning et al.

(10) Patent No.: US 11,015,304 B2
(45) Date of Patent: *May 25, 2021

(54) SELF-PROPELLED CONSTRUCTION MACHINE AND METHOD FOR OPERATING A SELF-PROPELLED CONSTRUCTION MACHINE

(71) Applicant: Wirtgen GmbH, Windhagen (DE)

(72) Inventors: Christian Berning, Zülpich (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 0 days.

This patent is subject to a terminal disclaimer.

(21) Appl. No.: 16/460,108

(22) Filed: Jul. 2, 2019

(65) Prior Publication Data
US 2020/0002904 A1    Jan. 2, 2020

Related U.S. Application Data (63) Continuation of application No. 15/534,812, filed as application No. PCT/EP2015/080699 on Dec. 20, 2015, now Pat. No. 10,358,780.

(30) Foreign Application Priority Data

Dec. 23, 2014 (DE) .......................... 102014019277.6
Mar. 5, 2015 (DE) .......................... 102015002743.3

(51) Int. Cl.
*E01C 23/00* (2006.01)
*E01C 23/088* (2006.01)
(Continued)

(52) U.S. Cl.
CPC .......... *E01C 23/088* (2013.01); *B23Q 17/099* (2013.01); *B28D 1/18* (2013.01);
(Continued)

(58) Field of Classification Search
CPC ...... E01C 19/004; E01C 23/088; E21C 25/20; E21C 31/02; B28D 1/18; B28D 25/10; B23Q 17/099
(Continued)

(56) References Cited

U.S. PATENT DOCUMENTS 5,318,378 A    6/1994 Lent
5,879,056 A    3/1999 Breidenbach
(Continued)

FOREIGN PATENT DOCUMENTS

DE    19818311 A1    10/1998
DE    69322281       1/1999
(Continued)

OTHER PUBLICATIONS

International Search Report in corresponding International Patent Application No. PCT/EP2015/080699 dated Jun. 27, 2017, 6 pp. (not prior art).
(Continued)

*Primary Examiner* — Raymond W Addie
(74) *Attorney, Agent, or Firm* — Lucian Wayne Beavers; Gary L. Montle; Patterson Intellectual Property Law, PC (57) ABSTRACT

The self-propelled construction machine, in particular road-milling machine, recycler, stabiliser or surface miner, comprises a machine frame 2, which is supported by a chassis 1, which has wheels or tracks 1A, 1B. A milling drum 4 is arranged on the machine frame. The wheels or tracks 1A, 1B and the milling drum 4 are driven by a drive unit 8. Furthermore, the construction machine comprises a control unit 19 for controlling the drive unit 8 and a signal-receiving unit 18 for detecting at least one measurement variable M(t) which is characteristic of an operating state of the milling drum 4. The construction machine is characterised in that the rotational speed of the milling drum 4 is adapted, on the
(Continued)

basis of at least one measurement variable M(t) which is characteristic of a critical operating state of the milling drum, to the operating conditions of the construction machine in such a way that the milling drum is operated in a non-critical operating state. The adaptive open-loop control of the milling drum rotational speed allows the construction machine to be operated at an optimum operating point with respect to the milling drum rotational speed.

18 Claims, 3 Drawing Sheets

(51) Int. Cl.
| | | |
|---|---|---|
| *E21C 31/02* | (2006.01) | |
| *B28D 1/18* | (2006.01) | |
| *B23Q 17/09* | (2006.01) | |
| *B28D 7/00* | (2006.01) | |
| *E01C 19/00* | (2006.01) | |
| *E21C 25/10* | (2006.01) | |

(52) U.S. Cl.
CPC ............ *B28D 7/005* (2013.01); *E01C 19/004* (2013.01); *E21C 31/02* (2013.01); *B28D 1/188* (2013.01); *E21C 25/10* (2013.01)

(58) Field of Classification Search
USPC .......................................... 404/93, 94, 84.05
See application file for complete search history.

(56) References Cited

U.S. PATENT DOCUMENTS

| | | | |
|---|---|---|---|
| 6,210,071 B1 * | 4/2001 | McSharry | E01C 23/0993 299/39.4 |
| 6,921,230 B2 | 7/2005 | Silay | |
| 7,422,391 B2 | 9/2008 | Holl et al. | |
| 7,905,682 B2 | 3/2011 | Holl et al. | |
| 7,984,953 B2 | 7/2011 | Gaertner et al. | |
| 8,128,177 B2 | 3/2012 | Menzenbach et al. | |
| 8,408,838 B2 * | 4/2013 | Willis | E01C 23/088 299/1.5 |
| 8,668,274 B2 | 3/2014 | Gaertner et al. | |
| 8,757,730 B2 | 6/2014 | Wachsmann et al. | |
| 8,958,959 B2 | 2/2015 | Von Schönebeck et al. | |
| 8,960,806 B2 | 2/2015 | Wachsmann | |
| 9,347,315 B2 | 5/2016 | Mëller et al. | |
| 9,864,347 B2 | 1/2018 | Laux et al. | |
| 10,000,897 B2 | 6/2018 | Reuter et al. | |
| 2004/0120766 A1 | 6/2004 | Silay | |
| 2005/0207841 A1 | 9/2005 | Holl et al. | |
| 2008/0173740 A1 | 7/2008 | Parker et al. | |
| 2010/0014917 A1 * | 1/2010 | Willis | E01C 23/088 404/93 |
| 2010/0063691 A1 | 3/2010 | Hall et al. | |
| 2011/0266858 A1 | 11/2011 | Laux et al. | |
| 2013/0287494 A1 | 10/2013 | Schlenker et al. | |
| 2014/0191560 A1 | 7/2014 | Gaertner et al. | |
| 2015/0227120 A1 | 8/2015 | Laux et al. | |
| 2016/0186392 A1 * | 6/2016 | Mahlberg | E01C 23/088 299/1.5 |

FOREIGN PATENT DOCUMENTS

| | | |
|---|---|---|
| DE | 10213017 A1 | 10/2003 |
| DE | 112008000646 T5 | 5/2010 |
| DE | 102010014893 A1 | 10/2011 |
| DE | 102011053984 A1 | 3/2013 |
| DE | 102012006189 A1 | 10/2013 |
| DE | 102014001885 A1 | 8/2015 |
| EP | 2354310 A2 | 8/2011 |
| EP | 2584095 A2 | 4/2013 |
| WO | 03064770 A1 | 8/2003 |
| WO | 2011128105 A2 | 10/2011 |
| WO | 2011128114 A2 | 10/2011 |

OTHER PUBLICATIONS

International Search Report in corresponding International Patent Application No. PCT/EP2015/080699 dated Feb. 15, 2016, 10 pp. (not prior art).

European Office Action on corresponding 18 208 011.9 dated Jun. 19, 2020, 4 pages (not prior art).

* cited by examiner

SELF-PROPELLED CONSTRUCTION MACHINE AND METHOD FOR OPERATING A SELF-PROPELLED CONSTRUCTION MACHINE

The invention relates to a self-propelled construction machine, in particular a road-milling machine, recycler, stabiliser or surface miner, which comprises a machine frame, which is supported by a chassis, which has wheels or tracks.

In road construction, self-propelled construction machines having different designs are used. These machines include the known road-milling machines, recyclers or stabilisers. Using the known road-milling machines, existing road layers of the road surface can be removed, and using the known recyclers, existing road surfaces can be restored. The known stabilisers are used to prepare the foundation for the road construction. Furthermore, what are referred to as surface miners are known as self-propelled construction machines by means of which coal or stone can be extracted.

The above-mentioned self-propelled construction machines comprise a rotating milling drum or a rotating milling/mixing rotor or a cutting roller, which are equipped with suitable milling or cutting tools. In the following, the milling drum, the milling/mixing rotor or the cutting roller of the known construction machines will be referred to as a milling drum.

To drive the wheels or tracks and the milling drum, the known construction machines comprise a drive unit. The drive power is generally transmitted from the drive engine to the wheels or tracks and the milling drum by means of separate drive trains, which each have their own transmission systems.

Furthermore, the known construction machines comprise a control unit, by means of which the drive unit is controlled. The control unit controls the drive unit in such a way that the construction machine moves at a specific travel speed, and the milling drum can rotate at a specific rotational speed.

The machine operator can specify the travel speed of the construction machine and the rotational speed of the milling drum within certain limits on the basis of the operating conditions in each case. In general, the rotational speed of the milling drum is determined by the rotational speed of the drive engine of the drive unit, and therefore the rotational speed of the milling drum can be controlled by adjusting the rotational speed of the engine. In addition, it can also be provided to adjust the rotational speed of the milling drum in steps or continuously by means of a transmission gear, or to drive the milling drum hydraulically or electrically, as a result of which the rotational speed of the milling drum can be continuously adjusted within broad ranges. In order to set the travel speed and the rotational speed of the milling drum, the known construction machines comprise an input unit. By means of the input unit, the machine operator can generally select discrete rotational speeds of the milling drum which he considers suitable for the project.

In practice, the aim is to operate the construction machine with as high a travel speed as possible so that the performance of the construction machine is as high as possible. However, the increase in the travel speed is limited inter alia by the maximum power of the drive unit, which is used not only to drive the wheels or tracks of the construction machine, but also to drive the milling drum. Furthermore, the fuel consumption of the internal combustion engine also plays a role when presetting the travel speed. In practice, it has been shown that the rotational speed of the milling drum is decisive for the quality of the milling or cutting process and the wear of the milling tools of the milling drum. The rotational speed of the milling drum also affects the fuel consumption and the consumption of coolant for cooling the milling bit.

In practice, as low a rotational speed as possible is sought for the milling drum. A low rotational speed of the milling drum advantageously results in a lower proportion of fines in the milled material, thereby also reducing the dust pollution. In the case of a lower rotational speed of the milling drum, the milling bits are subject to less wear. Furthermore, a reduction in the rotational speed of the milling drum also leads to savings in fuel and coolant. However, in practice, a reduction in the rotational speed of the milling drum is limited. If the rotational speed is too low, this leads to the problem that the kinetic energy of the milling drum is no longer sufficient to effectively machine the material. Then the milling drum runs in an out-of-round and bumpy course, which is exhibited inter alia as vibrations of the entire construction machine to the point of the machine rocking, which can result in damage to the machine. Furthermore, the quality of work also suffers as a result of the bumpy course of the milling drum, and irregularities can occur in the milling texture. In an extreme case, when there is insufficient kinetic energy, the milling drum can come to a standstill. This critical operating state is dependent not only on the rotational speed of the milling drum, but inter alia also on the travel speed of the construction machine, the nature of the material to be machined and the weight of the construction machine. Furthermore, the environmental conditions acting on the material can also be decisive. For example, asphalt is softer at higher temperatures than at low temperatures, and thus is easier to mill. Therefore, for example, on days with higher temperatures, when the material is the same, it is possible to use lower rotational speeds of the milling drum than on colder days. Consequently, due to different influencing factors in the milling process, it is not always possible to determine in advance the optimum rotational speed of the milling drum, at which it is ensured that there is as little wear as possible and an optimum milling texture over as far a travel distance of the construction machine as possible, but the occurrence of a critical operating state of the drum is prevented.

All of the construction machines known in the prior art are characterised in that, in order to prevent a critical operating state of the milling drum as a result of an excessive load, the travel speed of the construction machine is reduced. As a result, the performance of the machine is unnecessarily reduced if the critical operating state could not have been otherwise avoided. In the known construction machines, an increase in the load on the milling drum leads to a reduction in the travel speed, whereas the rotational speed of the milling drum is maintained. In this case, the rotational speed of the milling drum is regularly preset too high in order to prevent the occurrence of the critical operating state in all operating conditions.

EP 2 354 310 A2 (U.S. Pat. No. 8,128,177 B2) deals with the problem of undesirable travel movements of a road-milling machine by adjusting the drive on the basis of reaction forces acting on the milling drum. In order to detect said reaction forces, various sensors are proposed, in particular sensors for measuring deformations of individual machine components, in particular of the milling drum, or for measuring the pressure in the hydraulic system, for example the hydraulic pressure in the lifting cylinders for adjusting the height of the machine frame. If the measurement variable detected by the sensors exceeds a critical value, the travel speed of the construction machine is reduced. However, the rotational speed of the milling drum is maintained.

A road-milling machine, in which the travel speed is adjusted on the basis of a parameter which is characteristic of an operating state of the construction machine, is also known from U.S. Pat. No. 6,921,230 B2.

WO 03/064770 A1 describes a road-milling machine which comprises sensors for detecting an operating state of the milling drum. In addition to strain-measuring strips for detecting the operating state, a signal-receiving unit is also proposed, which detects vibrations on machine components. The vibrations of the milling drum are measured in order to determine the state of wear of the milling drum. In this case, it is assumed that the vibrations caused by new milling bits differ from the vibrations of worn milling bits in amplitude and/or frequency.

US 2008/0173740 A1 discloses adjusting the travel speed of the road-milling machine and the rotational speed of the milling drum in such a way that there is a preset ratio between the travel speed and the rotational speed of the milling drum.

Lastly, DE 102 13 017 A1 describes a method for optimising a milling process in road-milling machines, in which a characteristic value which is representative of the performance of the milling drum is identified in order to control the amount of coolant for the milling tools.

At the start of the operation, the machine operator must preset a specific travel speed for the construction machine and a specific rotational speed for the milling drum. However, with regard to the above-mentioned conditions, presetting the travel speed and the rotational speed of the milling drum in practice requires increased attention from the machine operator. In practice, for safety reasons or for convenience, the machine operator may simply preset a rotational speed of the milling drum which is selected to be higher than necessary. This leads to the disadvantages mentioned above.

The problem addressed by the invention is that of producing a self-propelled construction machine which can be reliably operated with high efficiency in different operating conditions. A further problem addressed by the invention is that of indicating a method by which a self-propelled construction machine can be reliably operated with high efficiency in different operating conditions.

These problems are solved according to the invention by the features of the independent claims. The dependent claims relate to advantageous embodiments of the invention.

The self-propelled construction machine according to the invention, in particular road-milling machine, recycler, stabiliser or surface miner, comprises a machine frame, which is supported by a chassis, which has wheels or tracks. A milling drum is arranged on the machine frame. The wheels or tracks and the milling drum are driven by a drive unit. The drive unit can be a device which comprises, for example, an internal combustion engine, in particular a diesel engine, and, for example, two drive trains for transmitting the drive power from the internal combustion engine to the wheels or tracks and the milling drum. The two independent drive trains can comprise their own transmission gears, and therefore the wheels or tracks can move independently of the milling drum. The drive unit can also comprise hydraulic gears for driving additional units of the construction machine, for example hydraulic lifting devices for adjusting the height of the machine frame. A drive unit is understood to also mean an arrangement which comprises a plurality of drive assemblies, for example separate drive assemblies for the wheels or tracks and the drive of the milling drum.

Furthermore, the construction machine comprises a control unit for controlling the drive unit and a signal-receiving unit for detecting at least one measurement variable which is characteristic of an operating state of the milling drum.

The construction machine according to the invention is characterised in that the control unit is configured in such a way that the rotational speed of the milling drum is adapted, on the basis of at least one measurement variable which is characteristic of a critical operating state of the milling drum, to the operating conditions of the construction machine in such a way that the milling drum is operated in a non-critical operating state.

The operating conditions of the construction machine can be preset parameters, for example the travel speed or milling depth. These parameters can be constant or also changed during the operation of the construction machine. The travel speed of the construction machine is of particular importance for adapting the rotational speed of the milling drum. The travel speed, to which the rotational speed of the milling drum can be adapted, can be a travel speed which is preset by the machine operator, which speed the machine operator can change during the operation of the construction machine. However, the travel speed can also be preset by an open-loop or closed-loop control of the construction machine. During the adaptation of the rotational speed of the milling drum, the travel speed does not need to be constant, but rather can also change due to the preset by the machine operator or the open-loop or closed-loop control. It is important for the travel speed to be controlled in an open-loop or closed-loop manner not on the basis of the variable which is characteristic of the operating state of the milling drum, but rather on the basis of other variables, if any closed-loop or open-loop control of the travel speed takes place at all.

Whereas in the prior art, a specific rotational speed of the milling drum is preset based, for example, on the optimum operating point of the drive unit, and if the travel speed of the construction machine is reduced because an overload state occurs, the construction machine according to the invention provides adaptive open-loop or closed-loop control of the rotational speed of the milling drum. In order to detect a critical operating state, one or more characteristic measurement variables can be assessed. In this case, various assessment algorithms can be used. This fundamentally different functional principle of the open-loop control according to the invention results in the following advantages over the prior art.

The adaptive open-loop control of the milling drum rotational speed allows operation of the construction machine at an optimum operating point with respect to the milling drum rotational speed. The rotational speed of the milling drum does not need to be set to a specific value in advance, which is considered to be optimum beforehand, but rather is automatically adapted to the operating conditions of the construction machine without there being a risk of the milling drum entering a critical operating state. In the case of said open-loop control, the travel speed is not affected by said open-loop control, although the travel speed can also change due to another open-loop or closed-loop control or a preset by the machine operator. The performance of the construction machine at least cannot be reduced thereby. The construction machine can thus be operated at as low a rotational speed of the milling drum as possible. This results in low wear of the milling tools and in lower fuel and coolant consumption. The adaptation of the rotational speed of the milling drum can take place at the start of the milling operations when positioning the construction machine so that the milling operations can be carried out at the optimum rotational speed of the milling drum, or can take place during the milling operations in response to changing operating conditions.

A preferred embodiment of the invention provides that the control unit be configured in such a way that the rotational speed of the milling drum is increased if the at least one measurement variable which is characteristic of the operating state of the milling drum exceeds a critical limit value so that the milling drum is operated in a non-critical operating state. In this case, the rotational speed of the milling drum can be increased in steps or continuously by a preset value until the at least one measurement variable which is characteristic of the operating state of the milling drum falls below the critical limit value by a preset tolerance value.

By means of the open-loop control, before starting the operations, the machine operator can preset any desired value, which is as low as possible, for the rotational speed of the milling drum without having to worry about the occurrence of a critical operating state. However, this value can also be a value which has already been determined by the open-loop control and which does not need to be preset by the machine operator. The open-loop control according to the invention then ensures that as low a rotational speed of the milling drum as possible is automatically set for the milling operations. The rotational speed of the milling drum is set to a value at which at least one measurement variable which is characteristic of the operating state of the milling drum falls below the critical limit value by a preset tolerance value. Said tolerance value can also be zero. The critical limit value can also be zero. In the simplest case, it is assumed that the milling drum is in a stable operating state if the characteristic measurement variable is zero, i.e. cannot be detected or measured, and that the operating state is unstable if the characteristic measurement variable is greater than zero, i.e. can be measured. However, it is advantageous if a tolerance value is taken into account.

For the opposite case, in which too high a rotational speed of the milling drum is preset as a starting value, which speed is above the value at which a critical operating state occurs, the adaptation of the rotational speed of the milling drum can also take place in that the rotational speed of the milling drum is reduced in steps or continuously starting from too high a value, provided that the at least one measurement variable which is characteristic of the operating state of the milling drum is still below a critical limit value, so that the milling drum, optionally taking into account a tolerance value, is still operated in a non-critical operating state.

For the input of the rotational speed of the milling drum by the machine operator, an input unit is preferably provided, by means of which the machine operator can select a preset value, for example from multiple preset values.

A particularly preferred embodiment provides that the control unit be configured in such a way that, after adapting the rotational speed in order to operate the milling drum in a non-critical operating state, the rotational speed of the milling drum is reduced, and a check is carried out as to whether, after the reduction of the rotational speed, the at least one measurement variable which is characteristic of the operating state of the milling drum is still below the critical limit value by a preset tolerance value. The reduced rotational speed is maintained when, after the reduction of the rotational speed, the at least one measurement variable which is characteristic of the operating state of the milling drum falls below the critical limit value by a preset tolerance value. Otherwise, the rotational speed is increased again. The ongoing adaptation of the rotational speed of the milling drum can take place in specific time intervals or after completing specific routes. An adaptation of the rotational speed of the milling drum can also take place at the points in time at which the operating conditions in question, for example the travel speed or milling depth, have changed. However, another adaptation will not be necessary if it is assumed that the operating conditions do not change substantially or at all, for example the road surface to be milled has predominantly the same material properties, and the travel and milling depth remain substantially constant.

One aspect of the invention lies in intervening in the control of the machine in order to reset the optimum operating point during operation of the construction machine at an operating point which is optimum beforehand, after a change in the operating or working conditions. The control unit preferably provides a target-value control mode, in which the construction machine moves at a specific travel speed and the milling drum rotates at a specific rotational speed. Said travel speed can be a speed which is manually preset or preset by an open-loop or closed-loop control and which can be constant or can also change. Furthermore, the control unit provides an adaptive control mode, in which the construction machine moves at the travel speed and the milling drum rotates at a rotational speed which is adapted in such a way that the milling drum is operated in a non-critical operating state. The control unit is configured in such a way that said unit transitions from the target-value control mode into the adaptive control mode on the basis of the at least one measurement variable which is characteristic of a critical operating state of the milling drum. In this way, it is ensured that the rotational speed of the milling drum is adapted, independently of any other already existing open-loop or closed-loop control of the travel speed, if the operating conditions have changed. In the adaptive control mode, the rotational speed of the milling drum is for example higher than the previously set rotational speed if the material to be machined has become harder and the load on the milling drum has become greater.

For the open-loop control according to the invention, it is essentially unimportant how the measurement variable which is characteristic of the critical operating state of the milling drum is detected.

In order to detect the critical operating state, a preferred embodiment provides a signal-receiving unit which comprises at least one sensor for detecting vibrations or impacts. For this purpose, the sensor used in this case can detect, for example, paths, speeds or accelerations. In this case, it is assumed that, in a critical operating state, the milling drum is subjected to or causes vibrations or impacts which are transmitted to the machine frame. Said vibrations or impacts can essentially be detected on all the components of the construction machine. This also includes the edge protector or the stripper of the known road-milling machines, which, in a critical operating state of the milling drum, can move up and down in a jerky manner. Consequently, in order to detect the height of the edge protector or stripper, any sensors which are already present are used as sensors for detecting vibrations or impacts. Vibrations or impacts can also be detected based on deformations of the components. In this respect, sensors can also be used which detect, for example, changes in the stress of components.

Furthermore, the measurement variable which is characteristic of the critical operating state of the milling drum can be a measurement variable which correlates to pressure fluctuations in the hydraulic pressure in a hydraulic system of the construction machine. Furthermore, fluctuations in the rotational speed of the drive engine, in particular the internal combustion engine, can be detected by rotating components in the drive train of the wheels or tracks and/or in the drive train of the milling drum.

The sensors which are suitable for detecting the characteristic measurement variable are known to a person skilled in the art. For example, accelerometers, strain-measuring strips, pressure sensors, angular sensors, rotational speed sensors etc. can be arranged on components of the construction machine. In order to confirm the measurement results, the measurement signals of a plurality of the same and/or a plurality of different sensors can also be assessed, which sensors can be arranged on the same or different components.

In the following, an embodiment of the invention will be described in greater detail with reference to the drawings, in which.

Figure 1:
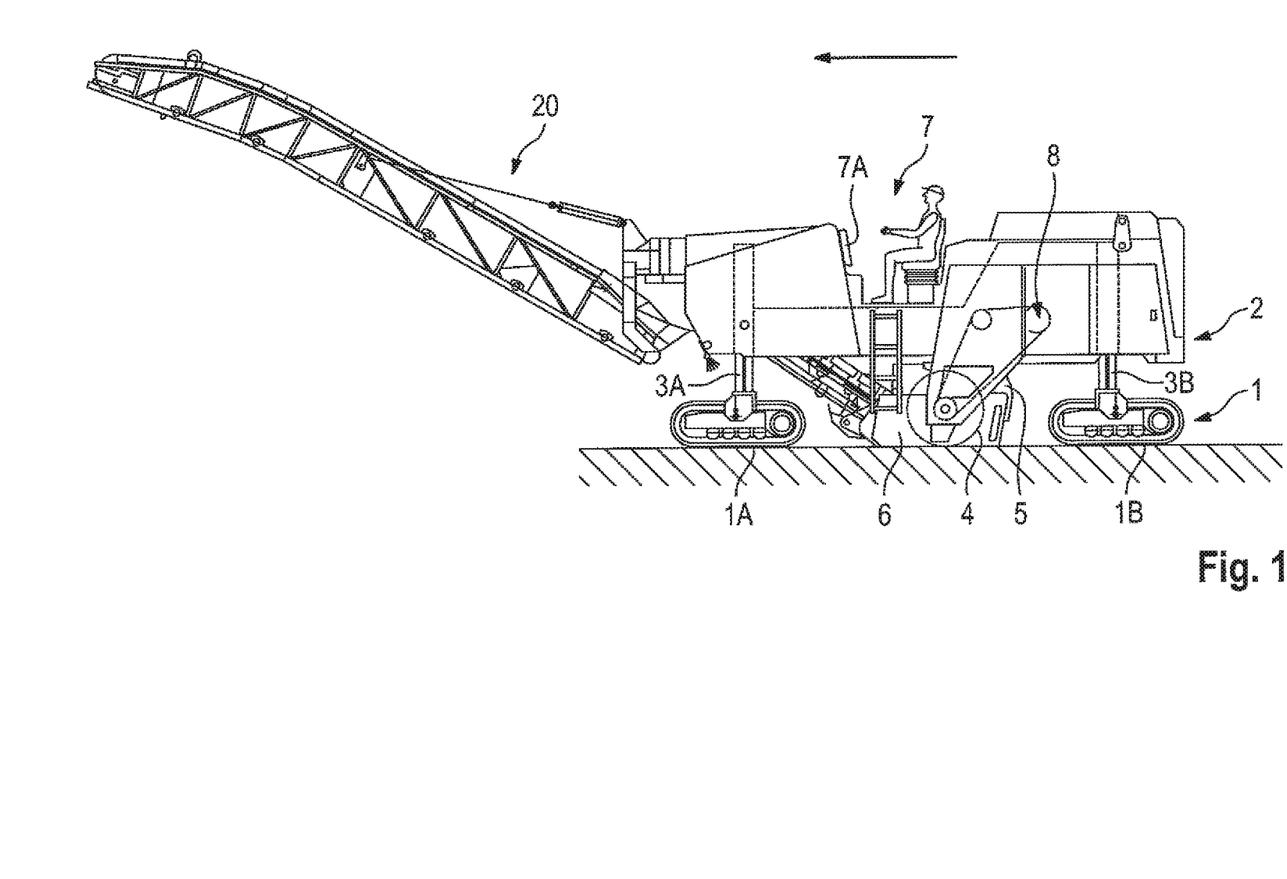
FIG. 1 is a side view of a road-milling machine as an example of a self-propelled construction machine.

FIG. 1 shows a road-milling machine for milling road surfaces made of asphalt, concrete or the like, as an example of a self-propelled construction machine. The road-milling machine comprises a machine frame 2 which is supported by a chassis 1. The chassis 1 of the milling machine comprises front and rear crawler tracks 1A, 1B, which are arranged on the right-hand and left-hand sides of the machine frame 2 in the operating direction. Instead of crawler tracks, wheels can also be provided. The crawler tracks 1A, 1B are fixed to lifting columns 3A, 3B, which are attached to the machine frame 2 so that the height of the machine frame can be adjusted with respect to the ground.

The road-milling machine comprises a milling drum 4, which is equipped with milling tools (not shown). The milling drum 4 is arranged in a milling drum housing 5 on the machine frame 2 between the front and rear crawler tracks 1A, 1B, which housing is closed on the long sides thereof by an edge protector 6 and on the rear side thereof by a stripper (not shown). The milled material is transported away by a conveying device 20. The operator's platform 7, which comprises a control panel 7A for the machine operator, is located on the machine frame 2 above the milling drum housing 5.

For driving the milling drum 4, the milling machine comprises a drive unit 8, which has an internal combustion engine 10. The internal combustion engine 10 also drives, in addition to the milling drum 4, the crawler tracks 1A, 1B or wheels and additional units of the milling machine.

Figure 2:
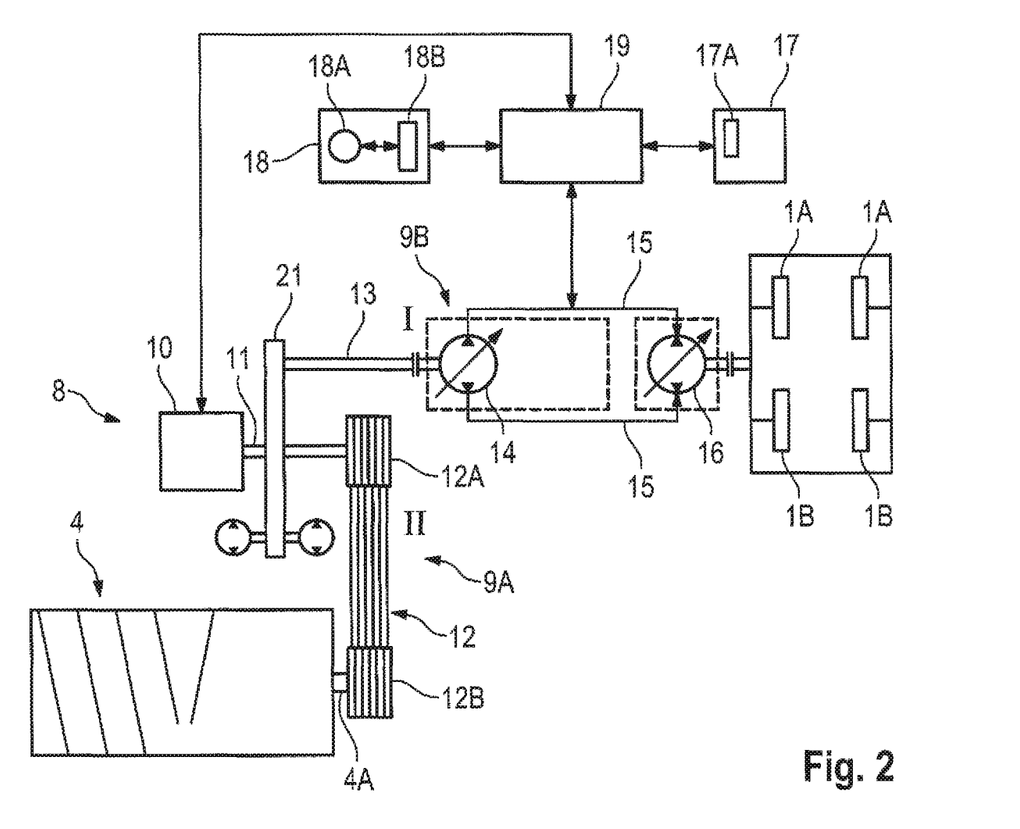
FIG. 2 is a simplified schematic view of the drive unit for driving the tracks or wheels and the control unit for the drive unit of the self-propelled construction machine.

FIG. 2 shows the two drive trains for transmitting the drive power from the internal combustion engine 10 to the tracks 1A, 1B or wheels and the milling drum 4. In FIG. 2, the crawler tracks or wheels are merely indicated.

In order to transmit the drive power to the tracks 1A, 1B, a first drive train I is used, whereas in order to transmit the drive power to the milling drum 4, a second drive train II is used. The two drive trains I and II each comprise a transmission system 9A, 9B. The output shaft 11 of the internal combustion engine 10 is connected to a drive element 12A of a traction drive 12 by means of a pump transfer gear 21, the output element 12B of which traction drive is connected to the drive shaft 4A of the milling drum 4. Consequently, the milling drum 4 of the internal combustion engine 10 is driven by means of the traction drive 12, it being possible to control the rotational speed n of the milling drum 4 by means of the rotational speed of the internal combustion engine 10. Alternatively, this can also take place by means of an additional switchable or continuously variable transmission.

In the milling machine, the drive is a hydraulic drive. The pump transfer gear 21 is connected to a hydraulic pump 14 by means of a shaft 13, the volumetric flow of which pump can be adjusted on the basis of a control signal so that the travel speed of the construction machine can be controlled independently of the rotational speed of the drive engine. The hydraulic pump 14 is in turn connected by means of hydraulic lines 15 to a hydraulic engine 16, which drives the crawler tracks 1A, 1B. Drive systems of this type are known to a person skilled in the art.

By means of an input unit 17 on the control panel 7A, the machine operator can set a specific travel speed for the construction machine. By means of the input unit 17, the machine operator can also set a specific rotational speed for the milling drum 4. For example, by means of a switch 17A, the machine operator can select specific rotational speeds $n_1$, $n_2$, $n_3$ etc. of the milling drum. The open-loop control of the drive unit 8 also provides, in addition to the operating mode in which the rotational speed of the milling drum can be freely preset, an operating mode in which the rotational speed of the milling drum is automatically adapted to the different operating conditions of the construction machine. This adaptive operating mode can be selected on the input unit 17.

The construction machine comprises a signal-receiving unit 18 for detecting at least one measurement variable which is characteristic of the operating state of the milling drum 4. In order to detect the measurement variable, the signal-receiving unit 18 comprises at least one sensor 18A, which is shown only schematically in FIG. 2 by way of example for all the sensors. In the present embodiment, the sensor 18A is an accelerometer which detects vibrations or impacts. The sensor can be arranged on a component of the construction machine to which are transmitted the vibrations or impacts which occur in a critical operating state of the milling drum 4, i.e. if the milling drum is operated at too low a rotational speed. In the present embodiment, the accelerometer 18A is fixed to the machine frame 2. However, the accelerometer 18A can also be arranged on the milling drum or the milling drum housing. Interfering signals are removed from the measurement signal of the accelerometer 18A using a filtering unit 18B, i.e. vibrations or impacts which are caused, for example, by the internal combustion engine 10 or the chassis 1. The filtering unit 18B is designed in such a way that the interfering signals, which differ from the characteristic measurement variable in amplitude and/or frequency, are filtered out.

Instead of an accelerometer, a strain sensor can also be provided, by means of which deformations on components of the construction machine, which occur in an unstable operating state, are measured. In the present embodiment, the strain sensor is fixed to the milling drum 4. However, at least one accelerometer and one strain sensor can also be provided, it being concluded that the operating state is unstable when the accelerometer detects vibrations or impacts, and/or the strain sensor detects deformations.

The control unit 19 for the drive unit 8 comprises a data-processing unit (microprocessor), on which a data-processing program (software) runs so that the method steps described below are carried out.

In a first embodiment, before the start of the milling operations, the machine operator presets a travel speed for the construction machine. When the machine operator selects the adaptive operating mode, the control unit 19 controls the drive unit 8 in such a way that the construction machine moves at the preset travel speed v and the milling drum 4 rotates at a specific rotational speed n. In the present embodiment, the rotational speed of the milling drum, which is fixed in advance by the control unit 19 and could also be freely preset by the machine operator, is below the rotational speed required for a non-critical operating state.

The sensor 18A of the signal-receiving unit 18 detects vibrations or impacts which occur when the rotational speed of the milling drum is too low. This characteristic measurement variable $M(t)$ is assessed in the control unit 19. The control unit 19 increases the rotational speed of the milling drum 4 in steps or continuously from the preset value until the characteristic measurement variable falls below a critical limit value by a preset tolerance value.

Figure 3:
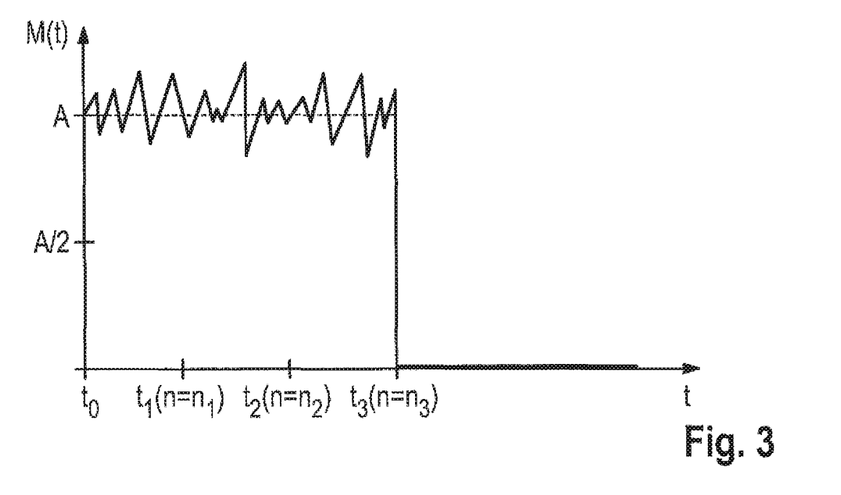
FIG. 3 shows the measurement variable which is characteristic of the operating state of the milling drum before and after the occurrence of a critical operating state of the milling drum.

Firstly, with reference to FIG. 3, an embodiment is described in which it is assumed that the average value of the characteristic measurement variable is A in a critical operating state and is ideally 0, but can also be greater than 0, in a non-critical operating state, the transition from a critical into a non-critical state being erratic, i.e. the measurement variable drops in an erratic manner to zero or to a value greater than zero which is considered to be non-critical. In FIG. 3, the characteristic measurement variable $M(t)$ is shown as a function of time for the case in which, in the time interval $t<t_3$, the milling drum 4 is operated at too low a rotational speed ($n_1$ or $n_2$), and at the point in time $t=t_3$ or in the time interval $t>t_3$, is operated at a rotational speed $n_3$ at which a critical operating state does not occur. A value which is less than A, for example A/2, is assumed as the critical limit value. The rotational speed n of the milling drum is increased from the preset value in steps $n_1$, $n_2$, $n_3$ ... $n_n$, or continuously. At the point in time $t=t_3$, the rotational speed has reached a value $n_3$ at which the characteristic measurement variable is 0, i.e. the characteristic measurement variable has fallen below the limit value A/2 by a preset tolerance value (A/2). At this point in time $t_3$, the operating state is stable. A non-critical operating state can also be assumed when the measurement variable is greater than 0, but less than the critical limit value, for example A/8. In this case, the tolerance value can be for example A/4. The transition from the critical into the non-critical state can also be continuous. From this time on, the control unit 19 sets the rotational speed $n_3$ as a target rotational speed for the milling drum. This is the optimum operating point. In order to increase safety, a rotational speed ($n=n_3+\Delta_n$) which is greater than the detected rotational speed $n_3$ by a predetermined amount $\Delta n$ can also be set as a target rotational speed.

In the embodiment, it is assumed that the transition from a critical into a non-critical operating state or vice versa is erratic. However, it is also possible for said transition to be continuous. Then, the average value A of the characteristic measurement variable $M(t)$ in a transition range will continuously decrease from an unstable to a stable state. In this case, by selecting a suitable tolerance value, the rotational speed of the milling drum can be detected, in which case a sufficiently stable state can be assumed, i.e. the characteristic measurement variable is sufficiently far from the critical limit value.

From this time on, the construction machine moves at the preset travel speed $v_{target}$, the milling drum 4 rotating at the optimum rotational speed $n_3=n_{target}$. Said rotational speed of the milling drum can essentially be maintained for the project if it is assumed that the operating conditions remain unchanged, for example the material properties of the ground material do not change and the milling depth or the travel are not changed either. Otherwise, it may be necessary to correct the rotational speed of the milling drum.

If the milling depth increases, the travel is increased, or the material to be milled becomes harder, a critical operating state is detected again, which, by means of the above-described routine, leads to another increase in the rotational speed of the milling drum.

However, should the material become softer, the rotational speed of the milling drum is no longer optimum, i.e. the rotational speed of the milling drum is too high, and this is not identified by means of the above routine. In this case, it can be provided for the control unit 19 to successively reduce the rotational speed of the milling drum and to check in each case whether, after the reduction of the rotational speed, the at least one measurement variable $M(t)$ which is characteristic of the operating state of the milling drum is still below the critical limit value by a preset tolerance value. The reduced rotational speed is then maintained as an adapted or corrected target rotational speed when the above condition is present. Otherwise, the rotational speed is increased again. The reduction of the rotational speed of the milling drum can take place in steps or continuously, for example after a preset time interval has elapsed, or after completing a preset route. After other parameters are changed, the rotational speed of the milling drum can also be adapted to the changed parameters, for example to a changed travel speed or milling depth.

In an alternative embodiment, the travel speed is not preset by the machine operator, but rather by an open-loop or closed-loop control, which can be part of the control unit 19. However, said open-loop or closed-loop control of the travel speed, which can take place according to the known methods, does not take place on the basis of the variable which is characteristic of the critical operating state of the milling drum. The adaptation according to the invention of the rotational speed of the milling drum then takes place independently of said open-loop or closed-loop control.

With reference to FIG. 4A to 4D, an additional embodiment is described in which an upper and lower limit value is defined for the effective value of the characteristic measurement variable $M(t)$.

Figure 4A:
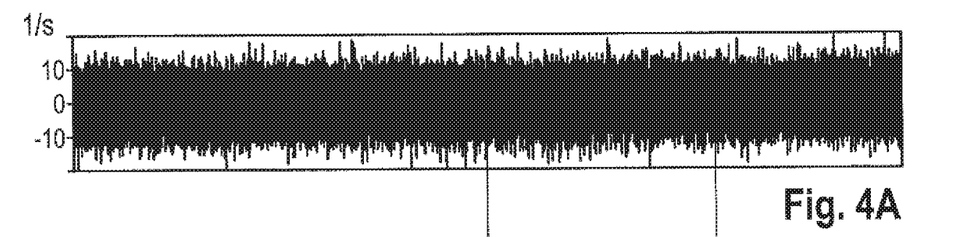
FIG. 4A, FIG. 4B, FIG. 4C and FIG. 4D show the characteristic measurement variable and the rotational speed of the milling drum in another embodiment of an open-loop control of the rotational speed of the milling drum.
Figure 4B:
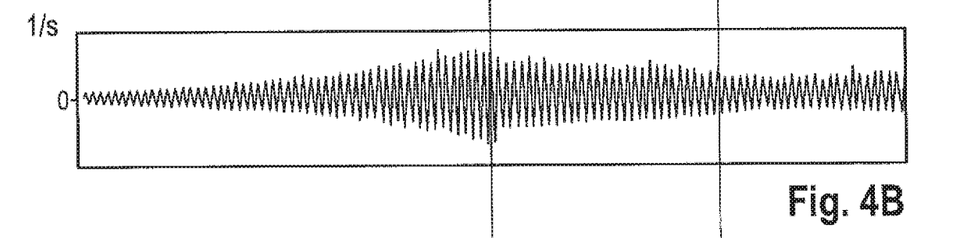

FIG. 4A shows the noisy output signal of the sensor 18A, for example of an acceleration sensor, as a function of time. The characteristic measurement variable $M(t)$ is superimposed by various disturbance variables in the output signal of the sensor 18A. The filtering unit 18B comprises a bandpass filter, which lets only signals in a frequency band of from, for example, 0.25 to 20 Hz, in particular from 0.5 to 10 Hz, pass. FIG. 5B shows the noise-free output signal of the bandpass filter. The filtering unit 18B further comprises a unit for determining the effective value of the output signal of the bandpass filter. The effective value of the output signal of the bandpass filter represents the characteristic measurement variable $M(t)$ (FIG. 4C).

Figure 4C:
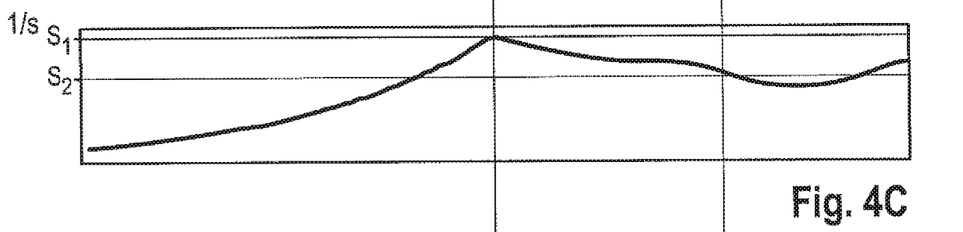
Figure 4D:
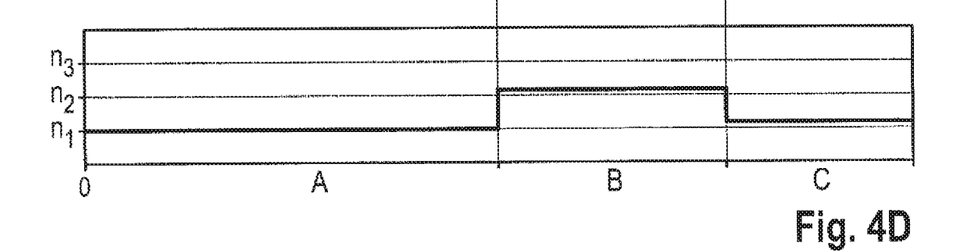

In the time interval A, the milling drum 4 initially rotates at a preset rotational speed $n_1$ (FIG. 4D). It is shown that, in the time interval A, the measurement variable $M(t)$ increases continuously, which makes it possible to conclude the occurrence of an unstable state (FIG. 4C). The increase in the measurement variable M(t) can be attributed to changing operating conditions, for example a change in the nature of the road surface to be milled. However, the measurement variable M(t) can also increase as a result of an increase in the travel speed in the time interval A, which speed is preset by another open-loop or closed-loop control, which is not based on monitoring the measurement variable M(t). In the present embodiment, at the point in time $t_1$ at which the characteristic measurement variable M(t) has reached or exceeded an upper critical limit value $S_1$, the rotational speed n of the milling drum 4 is increased in steps from $n_1$ to $n_2$ in order to achieve a non-critical operating state of the milling drum again. It is shown that the measurement variable M(t) drops below the upper critical limit value due to the increase in rotational speed. In the time interval B, the milling drum 4 is then operated at the increased rotational speed $n_2$, while the measurement variable M(t) continuously drops. In this embodiment, however, the measurement variable M(t) does not drop to zero in an erratic manner as in the embodiment from FIG. 3. However, should the measurement variable M(t) not drop, but rather reach or exceed the upper critical limit value $S_1$ again, the rotational speed n is increased again by an additional step to a rotational speed $n_3$. This step-by-step increase can take place successively until the upper critical limit value $S_1$ is no longer reached or exceeded. Consequently, it is not the travel speed of the milling machine, but rather the rotational speed of the milling drum which is the correction variable for achieving a non-critical operating state of the milling drum.

FIG. 4C shows the case in which increasing the rotational speed n of the milling drum from $n_1$ to $n_2$ is sufficient. It is shown that the measurement variable M(t) decreases after adapting the rotational speed n of the milling drum until it has reached or fallen below a lower limit value $S_2$ which is considered to be non-critical. If the rotational speed of the milling drum has reached or fallen below the lower limit value $S_2$, the rotational speed n of the milling drum 4 is reduced to the value $n_1$ again. In the subsequent time interval C, the rotational speed $n_1$ of the milling drum is maintained, while the measurement variable M(t) slowly increases again, but still remains below the upper critical limit value $S_1$. Consequently, an upper and lower switching point are set for an erratic or continuous increase in the rotational speed or reduction in the rotational speed within a preset tolerance range.

A particular aspect of the invention lies in the fact that the open-loop control of the drive unit of the construction machine provides a target-value control mode, in which the construction machine can be operated at an optimum operating point for specific operating conditions. In this control mode, the construction machine moves at a specific travel speed, which can be preset by the machine operator or an open-loop or closed-loop control, and the milling drum 4 rotates at a specific rotational speed. The construction machine can transition from the target-value control mode into an adaptive control mode, in which the construction machine moves at the travel speed and the rotational speed of the milling drum 4 is adapted in such a way that the milling drum is operated in a non-critical operating state. The travel speed of the construction machine is not affected by this open-loop control. The open-loop control of the drive unit 8 provides for a transition from the target-value control mode into the adaptive control mode on the basis of the measurement variable M(t) which is characteristic of a critical operating state of the milling drum 4. As a result, it is ensured that a critical operating state of the milling drum cannot occur, even when the operating conditions change. If, for example, the material to be machined becomes harder, and therefore the load of the milling drum becomes too high, the construction machine transitions into the adaptive control mode, in which the construction machine is operated at a higher rotational speed than the rotational speed preset for the previously softer material when the travel speed remains unchanged. If the material becomes softer again, the construction machine can transition into the target-value control mode again.

The invention claimed is:

1. A self-propelled construction machine, comprising:
  a machine frame;
  a plurality of wheels or tracks supporting the machine frame;
  a milling drum arranged on the machine frame;
  a drive unit for driving the wheels or tracks and the milling drum;
  at least one sensor configured to detect at least one measurement variable (M(t)) which is characteristic of an operating state of the milling drum; and
  a controller functionally linked to the drive unit and to the at least one sensor, and configured to provide:
    a target-value control mode, in which the construction machine moves at a specified travel speed and the milling drum rotates at a specified rotational speed, and
    an adaptive control mode, in which the construction machine moves at the specified travel speed and the milling drum rotates at a rotational speed which is adapted in such a way that the milling drum is operated in a non-critical operating state.

2. The self-propelled construction machine according to claim 1, further comprising a control panel configured to enable operator input selection of the specified travel speed, wherein the specified travel speed is controllable independently of the rotational speed of the milling drum and the at least one measurement variable (M(t)) which is characteristic of an operating state of the milling drum.

3. The self-propelled construction machine of claim 1, wherein the at least one sensor comprises at least one pressure sensor which is arranged in a hydraulic system of the construction machine for measuring fluctuations in the hydraulic pressure.

4. The self-propelled construction machine of claim 1, wherein the at least one sensor is configured to detect fluctuations in the rotational speed of rotating components in one or more of: the drive train of the wheels or tracks; and the drive train of the milling drum.

5. The self-propelled construction machine of claim 1, wherein the controller is configured in the adaptive control mode to increase the rotational speed of the milling drum if the at least one measurement variable (M(t)) which is characteristic of the operating state of the milling drum exceeds a critical limit value, wherein the milling drum is operated in a non-critical operating state.

6. The self-propelled construction machine according to claim 5, wherein the controller transitions from the target-value control mode into the adaptive control mode based on at least one measurement variable (M(t)) which is characteristic of a critical operating state of the milling drum and, the controller is configured in the adaptive control mode to, after adapting the rotational speed of the milling drum to operate the milling drum in a non-critical operating state:
  reduce the rotational speed of the milling drum, and determine whether, after the reduction of the rotational speed, the at least one measurement variable (M(t)) which is characteristic of the operating state of the milling drum is below a critical limit value by a preset tolerance value, wherein the reduced rotational speed is maintained or further reduced when, after the reduction of the rotational speed, the at least one measurement variable which is characteristic of the operating state of the milling drum stays below the critical limit value by a preset tolerance value.

7. The self-propelled construction machine according to claim 6, further comprising a control panel configured to enable operator selection of the adaptive control mode.

8. The self-propelled construction machine of claim 5, wherein the controller is configured in the adaptive control mode to increase the rotational speed of the milling drum in steps from a preset value until the at least one measurement variable (M(t)) which is characteristic of the operating state of the milling drum falls below the critical limit value by a preset tolerance value.

9. The self-propelled construction machine of claim 8, further comprising a control panel configured to enable operator input selection of the preset value for the rotational speed of the milling drum.

10. The self-propelled construction machine of claim 5, wherein the controller is configured in the adaptive control mode to continuously increase the rotational speed of the milling drum from a preset value until the at least one measurement variable (M(t)) which is characteristic of the operating state of the milling drum falls below the critical limit value by a preset tolerance value.

11. The self-propelled construction machine of claim 10, further comprising a control panel configured to enable operator input selection of the preset value for the rotational speed of the milling drum.

12. The self-propelled construction machine of claim 1, wherein at least one of the at least one sensor is configured to detect vibrations or impacts which occur during operation of the milling drum in a critical operating state.

13. The self-propelled construction machine according to claim 12, wherein the at least one sensor for detecting vibrations or impacts is an accelerometer or strain sensor which is arranged on a component of the construction machine.

14. The self-propelled construction machine of claim 12, wherein the at least one sensor for detecting vibrations or impacts is arranged on the milling drum, the milling drum housing or the machine frame of the construction machine.

15. A method for operating a self-propelled construction machine comprising a machine frame supported by a plurality of lifting columns having wheels or tracks attached thereto, and a milling drum arranged on the machine frame, the method comprising:
  enabling user selection of an adaptive control mode; and
  pursuant to user selection of said adaptive control mode,
    adapting the rotational speed of the milling drum from a specified rotational speed, based on at least one measurement variable (M(t)) which is characteristic of a critical operating state of the milling drum, in such a way that the milling drum is operated in a non-critical operating state.

16. The method of claim 15, wherein the rotational speed of the milling drum is increased if the at least one measurement variable (M(t)) which is characteristic of the operating state of the milling drum exceeds a critical limit value so that the milling drum is operated in a non-critical operating state.

17. The method of claim 16, wherein adapting the rotational speed of the milling drum from the specified rotational speed comprises:
  reducing the rotational speed of the milling drum, and
  determining whether, after the reduction of the rotational speed, the at least one measurement variable (M(t)) which is characteristic of the operating state of the milling drum is below the critical limit value by a preset tolerance value,
  wherein the reduced rotational speed is maintained or further reduced when, after the reduction of the rotational speed, the at least one measurement variable (M(t)) which is characteristic of the operating state of the milling drum stays below the critical limit value by a preset tolerance value.

18. The method of claim 15, further comprising automatically transitioning the construction machine between:
  a target-value control mode, in which the construction machine moves at a specific travel speed and the milling drum rotates at a specific rotational speed, and
  an adaptive control mode, in which the construction machine moves at the travel speed and the milling drum rotates at a rotational speed which is adapted in such a way that the milling drum is operated in a non-critical operating state,
  wherein the transition from the target-value control mode into the adaptive control mode is based at least in part on the at least one measurement variable (M(t)) which is characteristic of a critical operating state of the milling drum.

* * * * *